(12) United States Patent
Hoversten

(10) Patent No.: US 8,095,345 B2
(45) Date of Patent: Jan. 10, 2012

(54) STOCHASTIC INVERSION OF GEOPHYSICAL DATA FOR ESTIMATING EARTH MODEL PARAMETERS

(75) Inventor: Gary Michael Hoversten, Lafayette, CA (US)

(73) Assignee: Chevron U.S.A. Inc, San Ramon, CA (US)

( * ) Notice: Subject to any disclaimer, the term of this patent is extended or adjusted under 35 U.S.C. 154(b) by 400 days.

(21) Appl. No.: 12/356,450

(22) Filed: Jan. 20, 2009

(65) Prior Publication Data

US 2010/0185422 A1 Jul. 22, 2010

(51) Int. Cl.
*G06F 7/60* (2006.01)
*G06F 17/10* (2006.01)
*G06F 17/18* (2006.01)
*G06F 19/00* (2011.01)

(52) U.S. Cl. ............................................. 703/2; 702/181
(58) Field of Classification Search ....... 703/2; 702/181
See application file for complete search history.

(56) References Cited

U.S. PATENT DOCUMENTS

| 5,870,690 | A | 2/1999 | Frenkel et al. |
| 6,078,869 | A | 6/2000 | Gunasekera |
| 6,480,790 | B1 | 11/2002 | Calvert et al. |
| 6,826,486 | B1 | 11/2004 | Malinveno |
| 6,970,397 | B2 | 11/2005 | Castagna et al. |
| 7,089,166 | B2 * | 8/2006 | Malthe-Sorenssen et al. . 703/10 |
| 7,286,939 | B2 | 10/2007 | Bachrach |
| 7,328,107 | B2 | 2/2008 | Strack et al. |
| 7,373,251 | B2 | 5/2008 | Hamman et al. |
| 2008/0076186 | A1 * | 3/2008 | Denny et al. .................. 436/161 |
| 2009/0182448 | A1 * | 7/2009 | Mansfield et al. ............ 700/110 |
| 2009/0204327 | A1 * | 8/2009 | Lu et al. ........................... 702/7 |

OTHER PUBLICATIONS

Wu, Fu-Chun et al., "Bayesian Updating of Parameters of a Sediment Entrainment Model via Markov Chain Monte Carlo", Jan. 1, 2009, Journal of Hydraulic Engineering, ASCE.*
Harp, Dylan R. et al., "Aquifer Structure Identification Using Stochastic Inversion", Apr. 24, 2008, Geophysical Research Letters, vol. 35, American Geophysical Union.*
Woodbury, Allan et al., "Practical Probabilistic Ground-Water Modeling", Jul.-Aug. 1995, Ground Water, vol. 33, No. 4.*
Rokyta, D., "Tutorial: MCMC Methods in Phylogenics and Assessing Their Convergence", Dec. 2003.*
Warnes, Gregory R., "Hydra: A Java Library for Markov Chain Monte Carlo", Mar. 2002.*

(Continued)

*Primary Examiner* — Paul Rodriguez
*Assistant Examiner* — Cedric D Johnson
(74) *Attorney, Agent, or Firm* — Carlos L. Hanze; Marie L. Clapp

(57) ABSTRACT

A computer implemented stochastic inversion method for estimating model parameters of an earth model. In an embodiment, the method utilizes a sampling-based stochastic technique to determine the probability density functions (PDF) of the model parameters that define a boundary-based multi-dimensional model of the subsurface. In some embodiments a sampling technique known as Markov Chain Monte Carlo (MCMC) is utilized. MCMC techniques fall into the class of "importance sampling" techniques, in which the posterior probability distribution is sampled in proportion to the model's ability to fit or match the specified acquisition geometry. In another embodiment, the inversion includes the joint inversion of multiple geophysical data sets. Embodiments of the invention also relate to a computer system configured to perform a method for estimating model parameters for accurate interpretation of the earth's subsurface.

19 Claims, 5 Drawing Sheets

OTHER PUBLICATIONS

Hawkes, Daniel S., "A Comparison Between Gauss-Newton and Markov Chain Monte Carlo Based Methods for Inverting Spectral Induced Polarization Data for Cole-Cole Parameters", Nov. 6, 2008, Lawrence Berkeley National Laboratory, University of California.*

Langville, Amy N. et al. "Updating Markov Chains", Apr. 4, 2006.*

Neal, Slice Sampling, The annuals statistics, 2003, pp. 705-767, vol. 31 No. 3, Institute of Mathematical Statistics, Beachwood U.S.A.

Hastings, Monte Carlo sampling methods using Markov chains and their applications, Biometrika, 1970, pp. 97-109, vol. 57.

Raftery, How many Iterations in the Gibbs Sampler?, Bayesian statistics 4: oxford university press, 1992, pp. 763-773.

Chen, et al., A Bayesian model for gas saturation estimatin using marine seismic AVA and CSEM date, Geophysics, vol. 72, No. 2 (Mar.-Apr. 2007) WA85-WA95.

Hoversten, et al., Intergration of multiple electromagnetic imaging and inversion techniques for propsect evaluation, SEG/New Orleans 2006 Annual Meeting, pp. 719-723.

Chen, et al. Joint inversion of seismic AVO and EM data for gas saturation estimation using a sampling-based stochastic model, SEG Int'l Exposition and 74th Annual Meeting, Denver, Colorado, Oct. 10-15, 2004.

Chen, et al, Joint stochastic inversion of geophysical data for reservoir parameter estimation, SEG International Exposition and Seventy-Third Annual Meeting, Sep. 23, 2003.

* cited by examiner

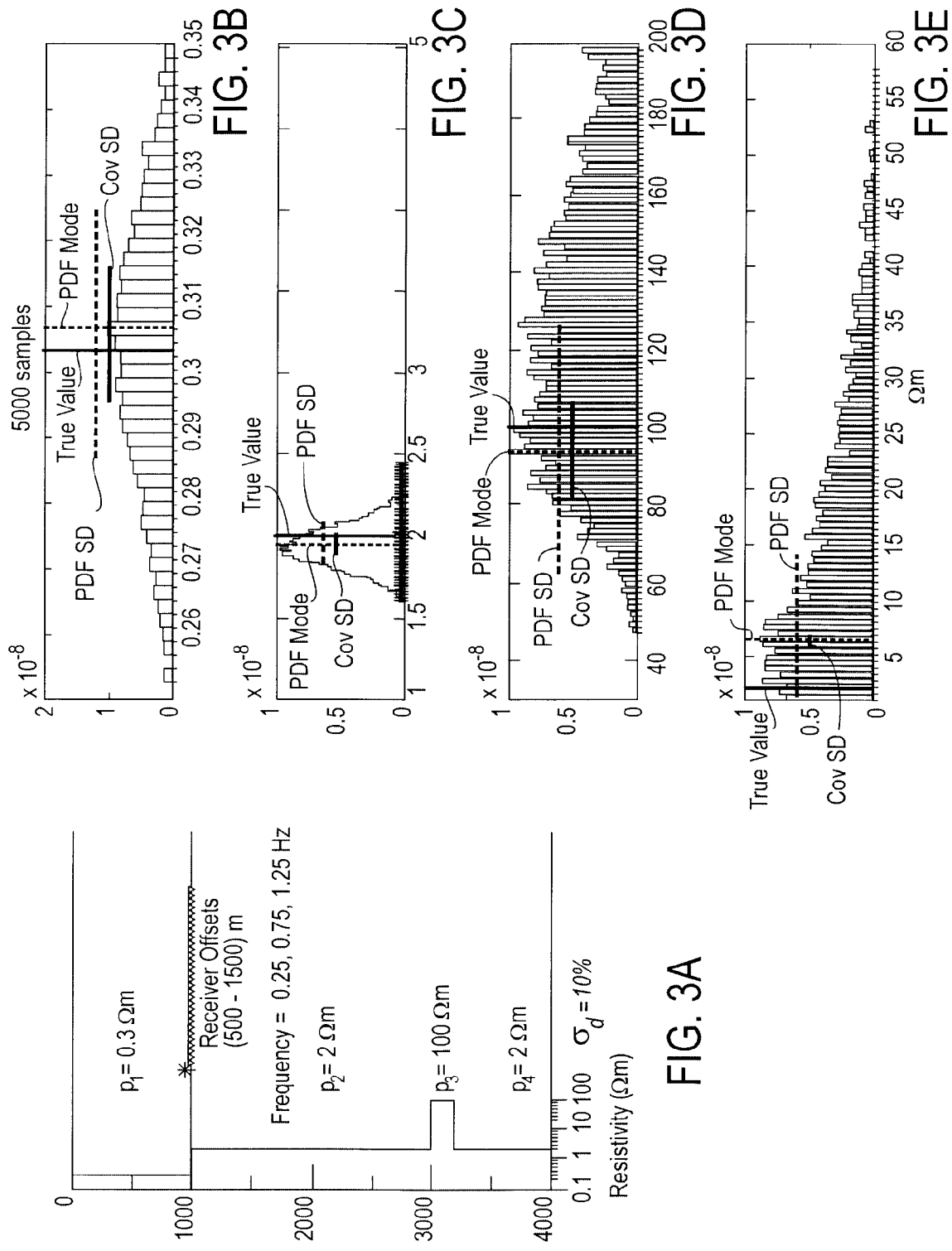

STOCHASTIC INVERSION OF GEOPHYSICAL DATA FOR ESTIMATING EARTH MODEL PARAMETERS

FIELD OF THE INVENTION

The invention relates to methods of inversion of geophysical data using a sampling-based stochastic method to derive accurate estimates of model error and model parameters.

BACKGROUND OF THE INVENTION

Estimating model parameters for oil and gas exploration from geophysical data is challenging and subject to a large degree of uncertainty. Seismic imaging techniques, such as seismic amplitude versus angle (AVA) and amplitude versus offset (AVO) inversion, can produce highly accurate estimates of the physical location and porosity of potential reservoir rocks, but in many circumstances has only a limited ability to discriminate the fluids within the reservoir. Other geophysical data such as electromagnetic (EM) methods can add information about water saturation, and by extension hydrocarbon saturations, because the electrical conductivity of rocks is highly sensitive to water saturation. However, estimating fluid saturation using EM data alone is impractical because EM data have low spatial resolution. Seismic and EM methods are sensitive to different physical properties of reservoir materials: seismic data are functions of the seismic P- and S-wave velocity and density of the reservoir, and EM data are functions of the electrical resistivity of the reservoir. Because both elastic and electrical properties of rocks are related physically to fluid saturation and porosity through rock-physics models, joint inversion of multiple geophysical data sets such as seismic data and EM data has the potential to provide better estimates of earth model parameters such as fluid saturation and porosity than inversion of individual data sets.

Prior art inversion of geophysical data to derive estimates of model error and model parameters commonly relies on gradient based techniques which minimize an object function that incorporates a data misfit term and possibly an additional model regularization or smoothing term. For example, Equation (1) is a general object function, $\phi$, commonly used $$\phi(m, d) = [D(d^o - d^p)]^H [(D(d^{obs} - d^p))] + \lambda (Wm)^H (Wm) \quad (1)$$

D is the data covariance matrix, $d^o$ and $d^p$ are the observed and predicted data respectively, W is the model regularization matrix, m is the vector of model parameters, this could be electrical conductivity, and $\lambda$ is the trade-off parameter that scales the importance of model smoothing relative to data misfit. H denotes the transpose-conjugation operator since the data d is complex. Linearizing equation (1) about a given model, $m_i$, at the $i^{th}$ iteration produces the quadratic form $$(J^T S^T S J + \lambda W^T W) m_{i+1} = J^T S^T S J m_i + J^T S^T S \delta d_i \quad (2)$$

where $m_{i+1}$ can be solved for using many techniques, a quadratic programming algorithm is one possibility. J is the Jacobian matrix of partial derivatives of data with respect to model parameters, S is the matrix containing the reciprocals of the data's standard deviations, such that $S^T = D^{-1}$. The current difference between calculated ($d^p$) and observed ($d^{obs}$) data is given by $\delta d_i = d^{obs} - d_i$. The trade-off parameter $\lambda$ is adjusted from large to small as iterations proceed.

When the algorithm, described by equations (1) and (2), converges to a minimum of the object function, $\phi$, a single model, m is produced. This prior art derived model is not guaranteed in any way to be the "global" or true model. Model parameter error, also known as model parameter standard deviations (the square root of the variance), estimates derived from model parameter covariance calculations, such as described by equations (1) and (2), are not accurate and provide an insufficient quantification of the true model parameter errors.

Unlike prior art inverse methods, inversion of geophysical data sets using a sampling-based stochastic model can provide an accurate estimate of the probability density functions (PDF's) of all model parameter values. Further, the sampling-based stochastic method can be used for joint inversion of multiple geophysical data sets, such as seismic and EM data, for better estimates of earth model parameters than inversion of individual data sets. The term stochastic inversion is used widely to cover many different approaches for determining the PDF's of model parameter variables. The model parameter PDF's provide an accurate estimate of the variance of each model parameter and the mean, mode and median of the individual model parameters. The accurate model parameter variances can be used when comparing multiple models to determine the most probable model for an accurate interpretation of the earth's subsurface.

SUMMARY OF THE INVENTION

One aspect of the invention relates to a stochastic inversion method for estimating model parameters of an earth model, having the following operations: acquiring at least one geophysical data set that samples a portion of the subsurface geological volume of interest, each geophysical data set defines an acquisition geometry of the subsurface geological volume of interest; generating a specified number of boundary-based multi-dimensional models of the subsurface geological volume of interest, said models being defined by model parameters; generating forward model responses of the models for each specified acquisition geometry; generating a likelihood value of the forward model responses matching the geophysical data set for each specified acquisition geometry; saving the model parameters as one element of a Markov Chain for each model; testing for convergence of the Markov Chains; updating the values of the model parameters for each model and repeating the operations above in series or in parallel, until convergence is reached; deriving probability density functions for each model parameter of the models which form the converged Markov Chains; calculating the variances, means, modes, and medians from the probability density functions of each model parameter for each model to generate estimates of model parameter variances and model parameters for the earth models of the subsurface geological volume of interest which are utilized to determine characteristics of the subsurface geological volume of interest.

Another aspect of the invention relates to a system configured to generate a multi-dimensional model of a geological volume of interest. In one embodiment, the system is configured to execute a computer readable medium containing a program which, when executed, performs an operation comprising acquiring at least one geophysical data set that samples a portion of the subsurface geological volume of interest, each geophysical data set defines an acquisition geometry of the subsurface geological volume of interest; generating a specified number of boundary-based multi-dimensional models of the subsurface geological volume of interest, said models being defined by model parameters; generating forward model responses of the models for each specified acquisition geometry; generating a likelihood value of the forward model responses matching the geophysical data set for each specified acquisition geometry; saving the model parameters as one element of a Markov Chain for each model; testing for convergence of the Markov Chains; updating the values of the model parameters for each model and repeating the operations above in series or in parallel, until convergence is reached; deriving probability density functions for each model parameter of the models which form the converged Markov Chains; calculating the variances, means, modes, and medians from the probability density functions of each model parameter for each model to generate estimates of model parameter variances and model parameters for the earth models of the subsurface geological volume of interest which are utilized to determine characteristics of the subsurface geological volume of interest.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3A to 3E illustrate a conductivity model and the calculated model parameter variances, means, modes, and medians, according to one or more embodiments of the invention.

DETAILED DESCRIPTION

Embodiments of the invention provide a computer implemented stochastic inversion method for estimating model parameters of an earth model. In an embodiment, the method utilizes a sampling-based stochastic technique to determine the probability density functions (PDF) of the model parameters that define a boundary-based multi-dimensional model of the subsurface. In some embodiments a sampling technique known as Markov Chain Monte Carlo (MCMC) is utilized. MCMC techniques fall into the class of "importance sampling" techniques, in which the posterior probability distribution is sampled in proportion to the model's ability to fit or match the specified data set or sets. Importance sampling results in an uneven sampling of model space which characterizes the areas of high probability with reduced number of forward function calls compared to more traditional sampling techniques. In another embodiment, the inversion includes the joint inversion of multiple geophysical data sets. Embodiments of the invention also relate to a computer system configured to perform a method for estimating model parameters for accurate interpretation of the earth's subsurface.

Figure 1:
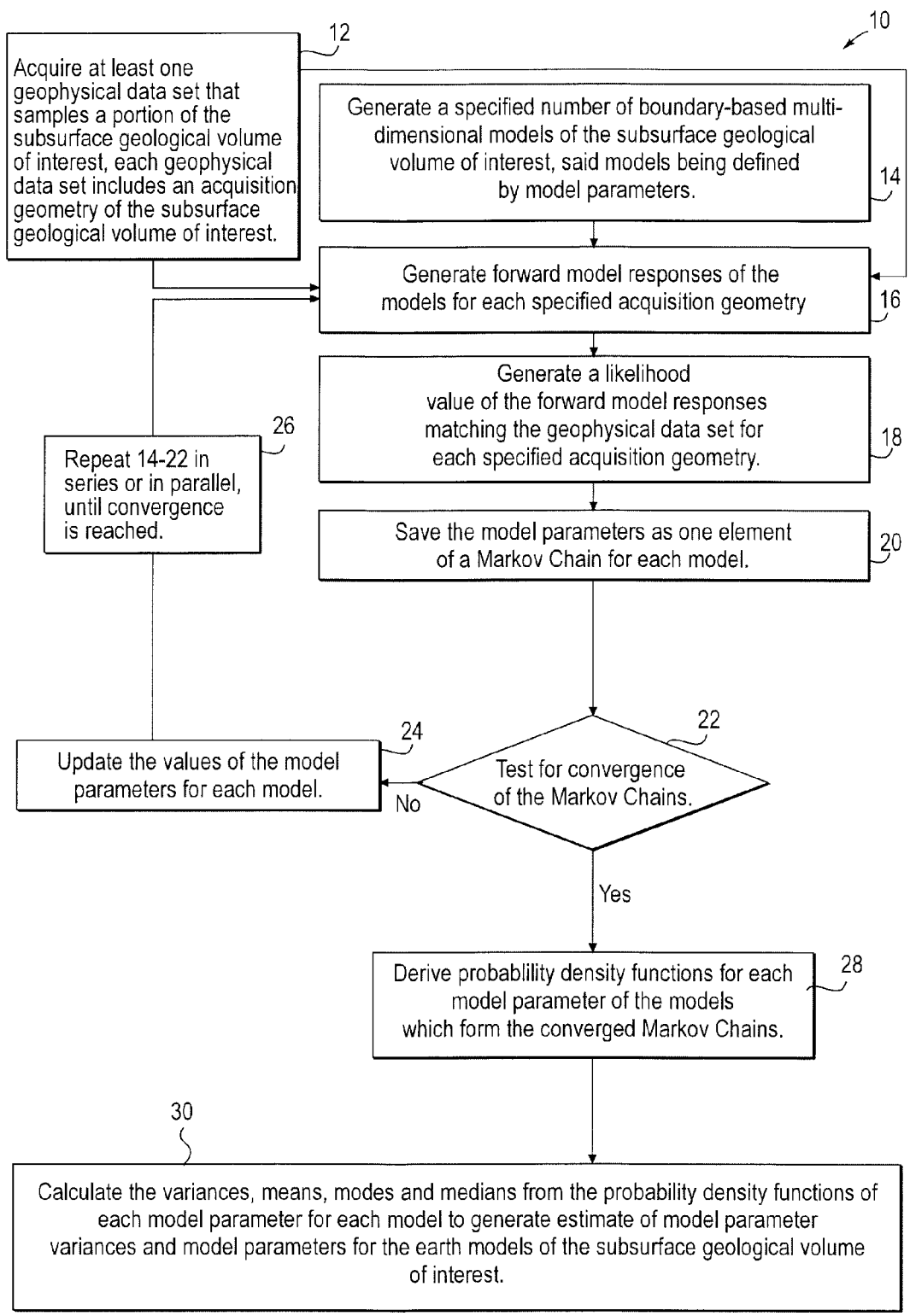
FIG. 1 illustrates a flowchart of a method of estimating model parameters in accordance with one or more embodiments of the invention.

Referring now to FIG. 1, this figure shows a method 10 for estimating model parameters of an earth model. The operations of method 10 presented below are intended to be illustrative. In some embodiments, method 10 may be accomplished with one or more additional operations not described, and/or without one or more of the operations discussed. Additionally, the order in which the operations of method 10 are illustrated in FIG. 1 and described below is not intended to be limiting.

The method 10 starts at an operation 12, where at least one geophysical data set is acquired. Each geophysical data set samples some portion of a subsurface geological volume of interest and is used to define a geophysical acquisition geometry of the geological volume of interest. The geophysical data set may include, for example, controlled source electromagnetic data (CSEM), magnetotelluric data, gravity data, magnetic data, seismic data, well production data or any combination of the foregoing.

The geophysical acquisition geometry is the locations in space (X,Y,Z) of the sources and receivers as well as any system operating parameters such as source tow speed and parameters that fully describe the source wave-form as a temporal function.

At operation 14, a specified number of boundary-based multi-dimensional models of the subsurface geological volume of interest are generated. In an embodiment, each model is comprised of model parameters which are defined at a plurality of locations in the geological volume of interest called nodes. A specified number of boundary-based multi-dimensional models are generated by taking the initial model parameters, as mean values along with a user defined model parameter variance to randomly select a new set of model parameter values from a user defined distribution (usually a Gaussian distribution, but other distributions are possible). Each set of unique model parameters define a two dimensional (2D), 3D or 4D model of the geological volume of interest.

In another embodiment, each model parameter has values comprising an X, Y and Z value for defining the node location in space and at least one geophysical property value. In an embodiment, the geophysical property value can include electrical conductivity or resistivity ($\sigma$), compressional velocity ($V_p$), shear velocity ($V_s$) and density($\rho$). In addition, the geophysical property values can include reservoir parameters such as fluid saturations, pressure, temperature and/or porosity. These reservoir parameters can be included by incorporating a rock physics model (derived from well log data), which link the geophysical parameters to the reservoir parameters. By way of non-limiting example, the model can be parameterized in terms of the geophysical properties as discussed above and/or reservoir properties, such as fluid saturation and porosity. In an embodiment, the geophysical property values are interpolated in space between a unique set of nodes to define the model boundaries and to generate the model parameters required for the calculation of the forward model responses. The boundary-based multi-dimensional models can then be projected onto a finite-difference or finite-element mesh for calculation of the forward model responses. The projection process is done such that cells which straddle a boundary are assigned a property value which is derived from a spatially weighted average of the property above and below the boundary.

Figure 2A:
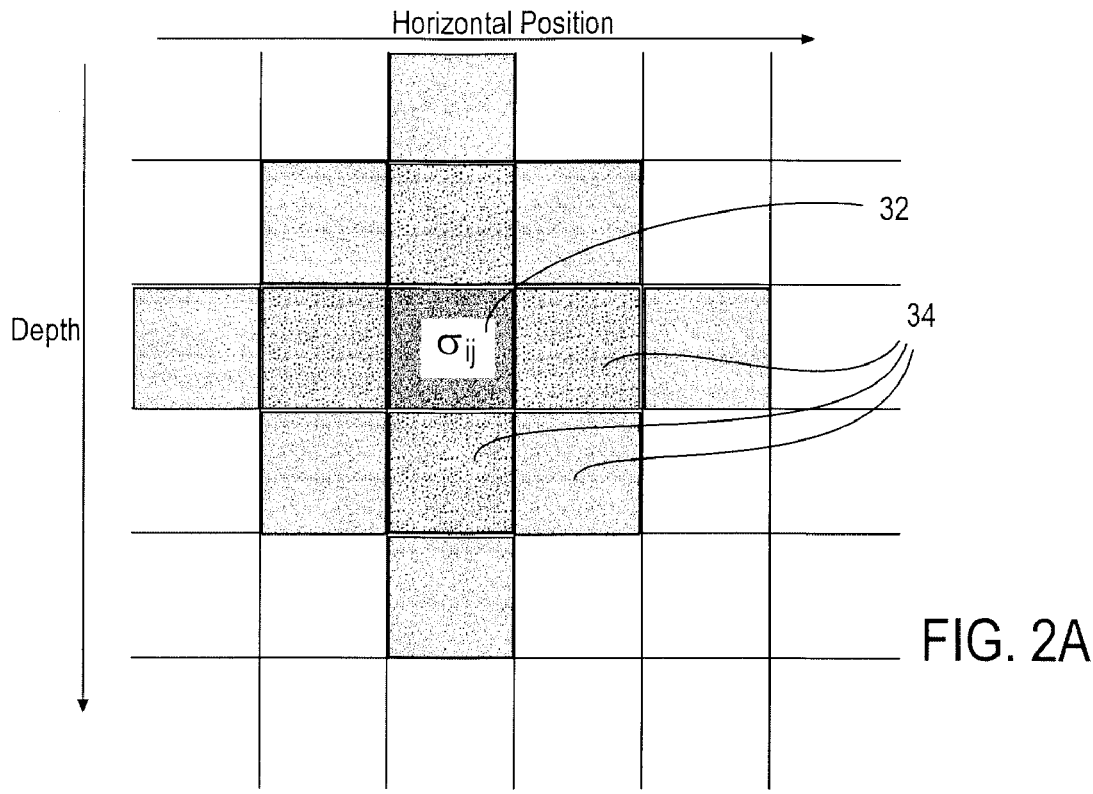
FIGS. 2A and 2B illustrate methods for model parameterization, in accordance with one or more embodiments of the invention.
Figure 2B:
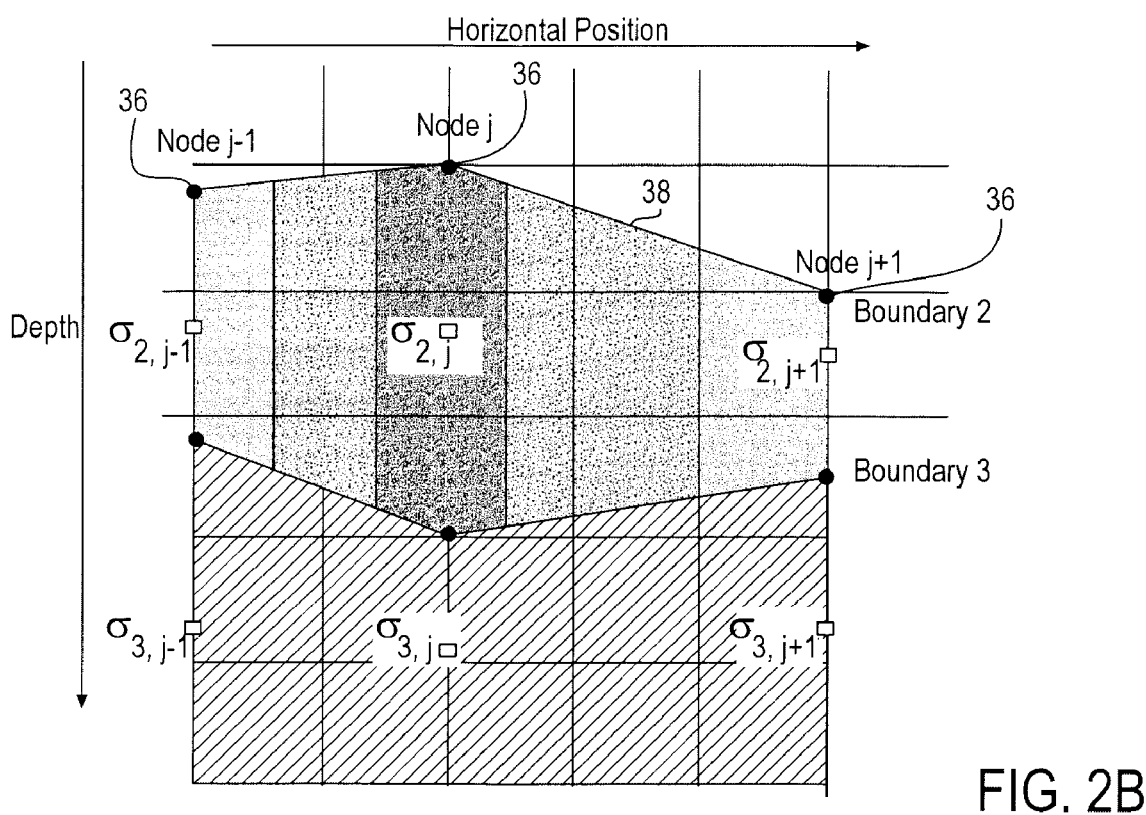

Generalized representations of model parameterization, in accordance with one or more embodiments of the invention, are shown in FIG. 2. FIG. 2A shows a standard cell based model parameterization. The geophysical property at each cell 32 is a model parameter with regularization or smoothing applied to all adjacent cells 34. The cell model is typically used in a finite-difference or finite-element calculation to generate the model response. FIG. 2B shows boundary-based model parameterization. Nodes 36 controlling boundaries 38 can be the model parameters, each node having a location and geophysical property value(s). The model parameters can be interpolated laterally and vertically between nodes. In an embodiment, the resulting boundary-based model can be projected onto a finite-difference or finite-element mesh for calculation of the forward model response.

Boundary-based model parameterization shown in FIG. 2B, solves several inherent problems with the traditional cell based model parameterization. As an illustration, a typical 2D finite-difference mesh would require on the order of 10 to 100 thousand cells to accurately calculate the forward model response to a model of interest. If the geophysical property of each cell is used as a model parameter in an inversion, there are two major problems created for a stochastic inverse. First, the conductivities of adjacent cells are highly correlated, as shown in FIG. 2A, causing convergence to be slow. Second, the cell based model parameterization does not correspond well to sedimentary geology with its inherent layered structure, with boundary between layers of relatively uniform properties. Boundary-based model parameterization greatly reduces the number of model parameters, only model parameters at nodes are used in the inversion, while at the same time the boundaries of the model correspond to geologic boundaries.

Referring back to FIG. 1, at operation 16, forward model responses of the models for each specified acquisition geometry are generated. The model comprised of all the model parameters at nodes on the boundaries is forward modeled by projecting the geophysical properties, such as conductivity, onto a finite-difference or finite element mesh and calculating the forward model response. At operation 18 numerical calculations are used to generate a likelihood value of the forward model responses matching the geophysical data set for each specified acquisition geometry. The inverse problem is defined as a Bayesian inference problem which requires defining the model likelihood function as well as the prior distribution of model parameters. In its simplest form this results in:

$$f(p|d) \propto f(d|p)f(p) \quad (3)$$

Where f(p|d) is the joint posterior PDF of all unknown model parameters, p given the data d. The first term on the right side of the equation, f(d|p), is the likelihood function of data, d, given model parameters p, and the last term on the right side, f(p), is the prior distribution of all unknown model parameters. The likelihood function, f(d|p), can take various forms depending on the model used to describe the noise in the data. By way of non-limiting example, for electromagnetic data E, when the error is assigned as a percentage of the measurement, it takes the form:

$$f(E|\sigma) = \prod_{i=1}^{nf} \prod_{j=1}^{no} \prod_{k=1}^{2} \frac{1}{\sqrt{2\pi\beta_j^2}} \exp\left\{-\frac{1}{2\beta_j^2}\left(\frac{e_{ijk} - M_{ijk}^e(\sigma)}{e_{ijk}}\right)^2\right\} \quad (4)$$

where the model electrical conductivity is σ. The observed electric field, e, is a function of frequency (total number of frequencies equal to nf), offset, (total number of offsets equal to no), and is complex resulting in 2 components (real and quadrature). The forward model response is $M_{ijk}^e(\sigma)$. The error β, is a function of offset (j) and is a percent of e.

If reflection seismic data is modeled in the shot domain where there are $N_t$ time samples and $N_a$ reflection angles the forward modeled seismic data can be represented as:

$$r_{ij} = S_{ij}^a(V_p, V_s, \rho) + \epsilon_{ij}^a \quad (5)$$

where i is the time index (1 to $N_t$) and j is the angle index (1 to $N_a$), S is the seismic forward problem and ε is the measurement error. If the errors are assumed to be Gaussian then the seismic likelihood function f, would be:

$$f(S|V_p, V_s, \rho) = \frac{1}{\sqrt{(2\pi)^2|\Sigma|}} \exp\left(-\frac{1}{2}\varepsilon^T \Sigma^{-1} \varepsilon\right) \quad (6)$$

Where, ε is the vector of data errors and Σ is the data covariance matrix.

In some embodiments, MCMC sampling techniques can be used to estimate f(d|p). Traditional Monte Carlo methods are impractical due to the high number of model parameters and high dimensionality of the problems to solve. In conjunction with the MCMC approach to the stochastic inverse equations (4) and (6) the use of boundary-based model parameterization illustrated in FIG. 2B can also be utilized to reduce the number of model parameters in the equation.

In some embodiments, more than one data type and its associated acquisition geometry may be used. For example a non-limiting example would be the combination of CSEM and seismic reflection data. In this case the geophysical parameters at each boundary node would be electrical conductivity, compressional velocity, shear velocity and density. The seismic forward model, represented by S in equations (5) and (6) above could be a finite-difference or finite-element implementation of the elastic wave equation. When the error is assumed to be Gaussian the associated likelihood function for the seismic data would be of the form of equation (6) above.

If seismic data is added then the Bayesian inverse problem, equation (3), must be modified to:

$$f_{SE}(p|d) \propto f(S|V_p, V_s, \rho)f(E|\sigma)f(V_p, V_s, \rho)f(\sigma), \quad (7)$$

where $f_{SE}$ is the combined pdf, $f(S|V_p, V_s, \rho)$ is the seismic likelihood function (equ. 6), $f(E|\sigma)$ is the CSEM likelihood function (equ. 4), $f(V_p, V_s, \rho)$ is the prior for the seismic parameters and $f(\sigma)$ is the prior for the conductivity parameters.

At operation 20 illustrated in FIG. 1 the model parameters are saved as one element of a Markov Chain for each model. The number of Markov Chains is equivalent to the number of specified models at the beginning of the inversion. It should be appreciated by one skilled in the art that a number of MCMC sampling algorithms exist, for example, a combination of Metropolis-Hastings (Hasting, 1970) sampling and Slice Sampling (Neal, 2003) can be used to generate a sequence of model parameters that form Markov Chains.

Determination is made at operation 22 as to whether convergence of the Markov Chains is obtained within a defined tolerance. The Markov Chains are converged when the PDFs of the model parameters are an accurate representation of the true distributions, given the level of noise, so that the statistical moments of the distributions (mean, median, mode and variance) are accurate. Markov Chains can be run more than once, either sequentially, or in parallel in order to determine convergence. Many methods can be used to determine convergence of the Markov chains, such as the methods developed by Gelman and Rubin (1992) and Raftery and Lewis (1992). In one embodiment the method of Gelman and Rubin is used where the convergence test computes the within-sequence variance W and the between-sequence variance B/n as follows:

$$B/n = \frac{1}{m-1} \sum_{j=1}^{m} (p_j - \mu)^2 \quad (8)$$

$$W = \frac{1}{m(n-1)} \sum_{j=1}^{m} \sum_{t=1}^{n} (p_{jt} - \mu_j)^2 \quad (9)$$

where m is the number of Markov Chains, n is the number of samples in the chain, and $p_{jt}$ is the $t^{th}$ of the n iterations of p in chain j.

Having computed (8) and (9) an estimate of the model parameter variances, $\sigma^2$, is computed by a weighted average of B and W as:

$$\sigma_+^2 = \frac{n-1}{n} W + \frac{B}{n} \quad (10)$$

The potential scale reduction factor is computed as:

$$R = \frac{m+1}{m} \frac{\sigma_+^2}{W} - \frac{n-1}{mn} \quad (11)$$

If R, equation (11), is close to 1 the chains are considered to have converged. The determination of how close is "close enough" is done by testing on synthetic models prior to inversion of real data. For example, a value of 1.1 for R may be sufficient in some embodiments of the present invention.

At operation 24 the values of the model parameters for each model are updated. If at operation 22 convergence is not obtained (R is not close to 1) the model parameters are updated by any number of sampling algorithms. A non-limiting example would be the use of the Metropolis-Hastings sampling algorithm, using the existing parameter values as mean values and a Gaussian distribution of assumed variance to draw a new value for each model parameter. Another possibility is the use of the Slice-Sampling algorithm to generate new model parameters. In one embodiment, the choice of the sampling algorithm at each iteration is determined by a random draw of a uniform variable where the probability of each sampling technique being used on any iteration is assigned at the start of the inversion. For example, assign a probability of 0.4, 0.4, 0.1, 0.1 for multi-variant Metropolis-Hasting, multi-variant Slice-Sampling, uni-variant Metropolis-Hasting, and uni-variant Slice-Sampling respectively, then at each iteration a uniform random number is generated and its value determines which sampling technique is used. Once a new model is generated the workflow 10 proceeds to operation 26 and operations 14 to 22 are repeated until convergence is reached within a defined tolerance, i.e. when the PDFs of the model parameters are an accurate representation of true distributions in the model parameters. The Markov Chains may not converge if there are insufficient iterations or if there are an insufficient number of Markov Chains. When R, equation (11), is within a defined tolerance of the value 1, the Markov Chains have converged and sampling can stop. The algorithm is implemented both for serial (single processor) and parallel (clusters) computing. The serial implementation is for simple model testing and algorithm refinement while the parallel implementation is best suited for large scale production inversions.

If convergence is obtained at operation 22, the method proceeds to operation 28 where all the model parameter values from the chains are binned to produce a PDF for each parameter. The PDF gives the probability that the model parameters are consistent with the geophysical data set. The PDF contains the most likely value of the model parameters and quantifies the uncertainty in the estimate.

At operation 30, the PDFs for each model parameter resulting from operation 28 are used to calculate the variances, means, modes, and medians of each model parameter for each model of the subsurface geological volume of interest. Joint inversion of multiple geophysical data types, each sensitive to different physical properties of reservoir materials, provide better estimates of the earth model parameters than inversion of individual data sets.

In an embodiment, the calculated mean, mode and median of each model parameter PDF is used as model parameter values and a forward simulation is performed to compute a data root means square (RMS) data misfit. This is a measure of how well the calculated data fits the geophysical data set. The user is presented with 3 models from the mean, mode and median of the model parameter PDFs and the associated RMS data misfit. In addition, the variance of each model parameter can be computed along with a graphical illustration of the PDF and the mean, mode and median values. Providing better estimates of model parameters which are used to interpret the subsurface geological volume of interest.

In another embodiment, the user can use any or all of these three models as starting models for a deterministic inversion (least squares), a minimization of equation (1), to find the model with the lowest RMS data misfit. This operation provides a deterministic inverse with an improved starting model which greatly increases its chances of reaching the global minimum.

It will be appreciated that the workflow of FIG. 1 is intended to encompass several scenarios for estimating model parameters. In some embodiments method 10, using boundary-based model parameterization coupled with a stochastic inversion, is extended to include the joint inversion of multiple data types to estimate a single self consistent model. In other embodiments the joint inversion models can be parameterized in terms of the geophysical and/or reservoir properties. The approach can be implemented in 2D, 3D and 4D. In a non-limiting example, the finite-element based inversion algorithm shown in equation (4) is implemented using stochastic MCMC sampling of a boundary-based model parameterization. The modeled geophysical property is the conductivity ($\sigma$). In 2D the boundaries are described using linear interpolating functions between nodes on a CSEM towline (the horizontal axis) and depth on the vertical axis. In 3D the boundaries are described by nodes in X, Y and Z with a bi-linear or higher-order interpolating function used to produce surface Z and model conductivity values at arbitrary locations within the 3D model. The electrical conductivity can be a scalar, a vector or a tensor for isotropic, transverse anisotropic or full anisotropic models respectively. For the isotropic case, the value of $\sigma$ is independent of the coordinate direction. For transverse anisotropy there are 3 components ($\sigma_x$, $\sigma_y$, $\sigma_z$) of the conductivity, each of which can be independently estimated. The most general case, full anisotropy, results in a symmetric conductivity tensor given by, $$\begin{bmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{bmatrix} \quad (9)$$

where the off-diagonal terms are symmetric, ($\sigma_{xy}=\sigma_{yx}$, etc.). Hence, the inversion for isotropic, transverse anisotropic and full anisotropy results need to estimate 1, 3 or 6 conductivity parameters respectively per node per surface in the inversion. In other embodiments where other geophysical data are used, such as seismic, the associated geophysical parameters would be treated just as explained for electrical conductivity.

Traditionally the use of 3D seismic data at successive times over a producing reservoir to image changes in the reservoir is referred to as 4D. The new inversion technique can be used as a 4D technique to monitor changes in the earth over time as production occurs from a petroleum reservoir by inverting observed data taken at progressive times during productions. Observed data at each time step is inverted and the changes between times are used to determine where the reservoir is changing.

FIG. 3 illustrates a conductivity model, according to one or more embodiments of the invention. A simple layered 1D conductivity model of P1-P4 is shown in FIG. 3A. The simulated responses to a CSEM survey acquisition geometry are shown in FIGS. 3B-3E. FIG. 3B corresponds to P1, FIG. 3C corresponds to P2, FIG. 3D corresponds to P3, FIG. 3E corresponds to P4. The electromagnetic source is located 50 m above the sea floor with the electromagnetic receivers placed on the sea floor. The source is an electric dipole operated at 0.25, 0.75 and 1.25 Hz. The receivers are offset from the source from 500 to 1500 m. The simulated data had 10 percent Gaussian random noise added prior to inversion.

While the gradient based algorithm given by equations (1) and (2) can find a solution, in this example, that is as close to the true values (True Value) as are the modes of the PDF's (PDF Mode), the resulting model parameter standard errors (Cov SD) are between a factor of 2 and 5 too small. This is a critical short coming of a traditional inversion approach if the resulting model error estimates are to be used in any quantitative risk assessment process. The model parameter error calculation from the model covariance matrix at the minimum of equation (1) is insufficient compared to the model parameter PDF standard errors (PDF SD).

Figure 4:
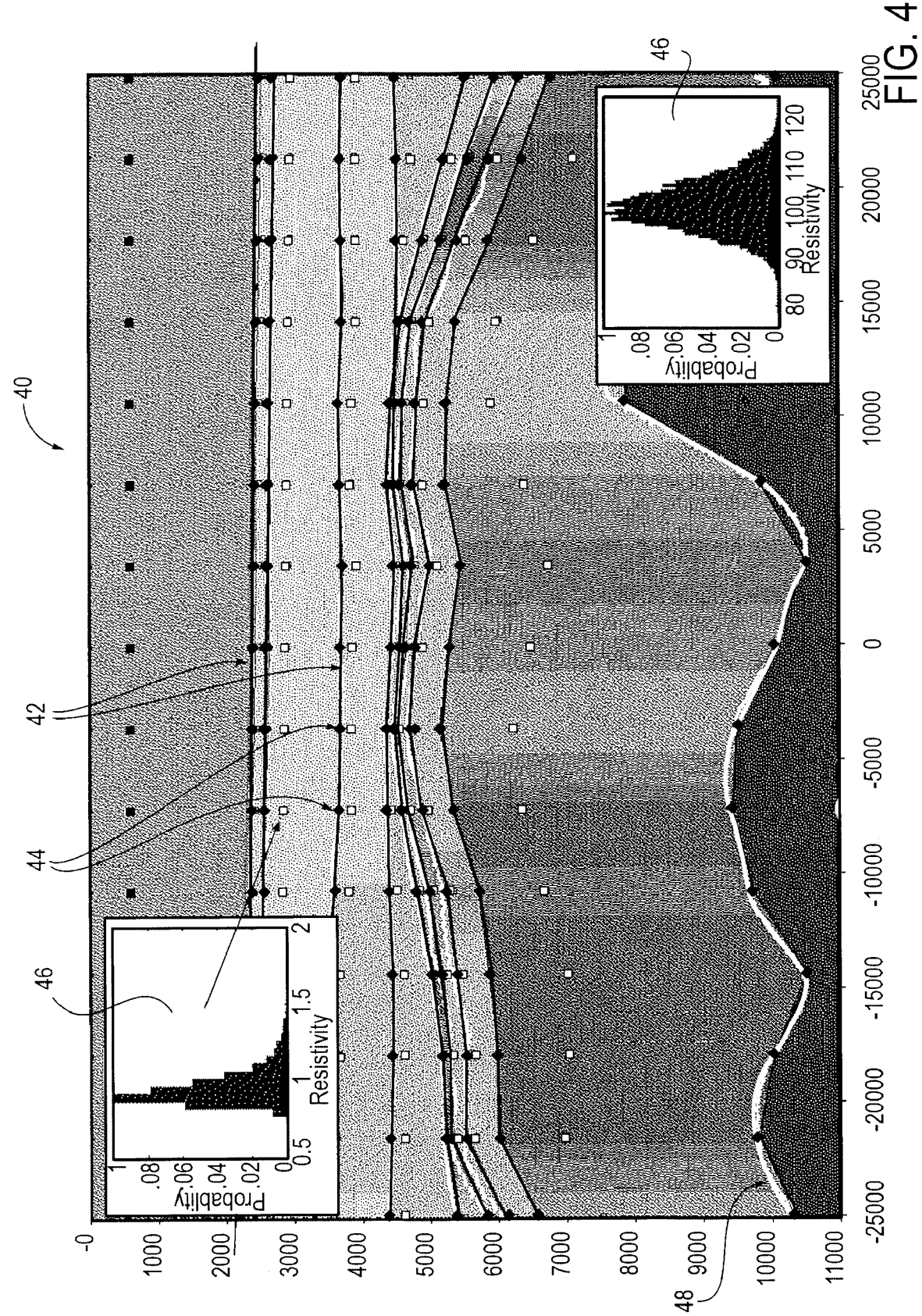
FIG. 4 illustrates a boundary-based multi-dimensional model of the subsurface, according to one or more embodiments of the invention.

FIG. 4 illustrates a method of stochastic inversion, according to one or more embodiments of the invention. A graphical illustration 40 is shown of a 2D boundary-based model having 10 layers. Nodes controlling boundary 42 depth (Z) are black filled diamonds 44, nodes controlling geophysical properties are open squares 46. White lines are horizons 48 interpreted from seismic data. Grey scale is electrical conductivity, with light being conductive and dark being resistive. Example resistivity PDF's are shown for 2 nodes. The model shown uses the mode of each PDF as the node conductivity.

Figure 5:
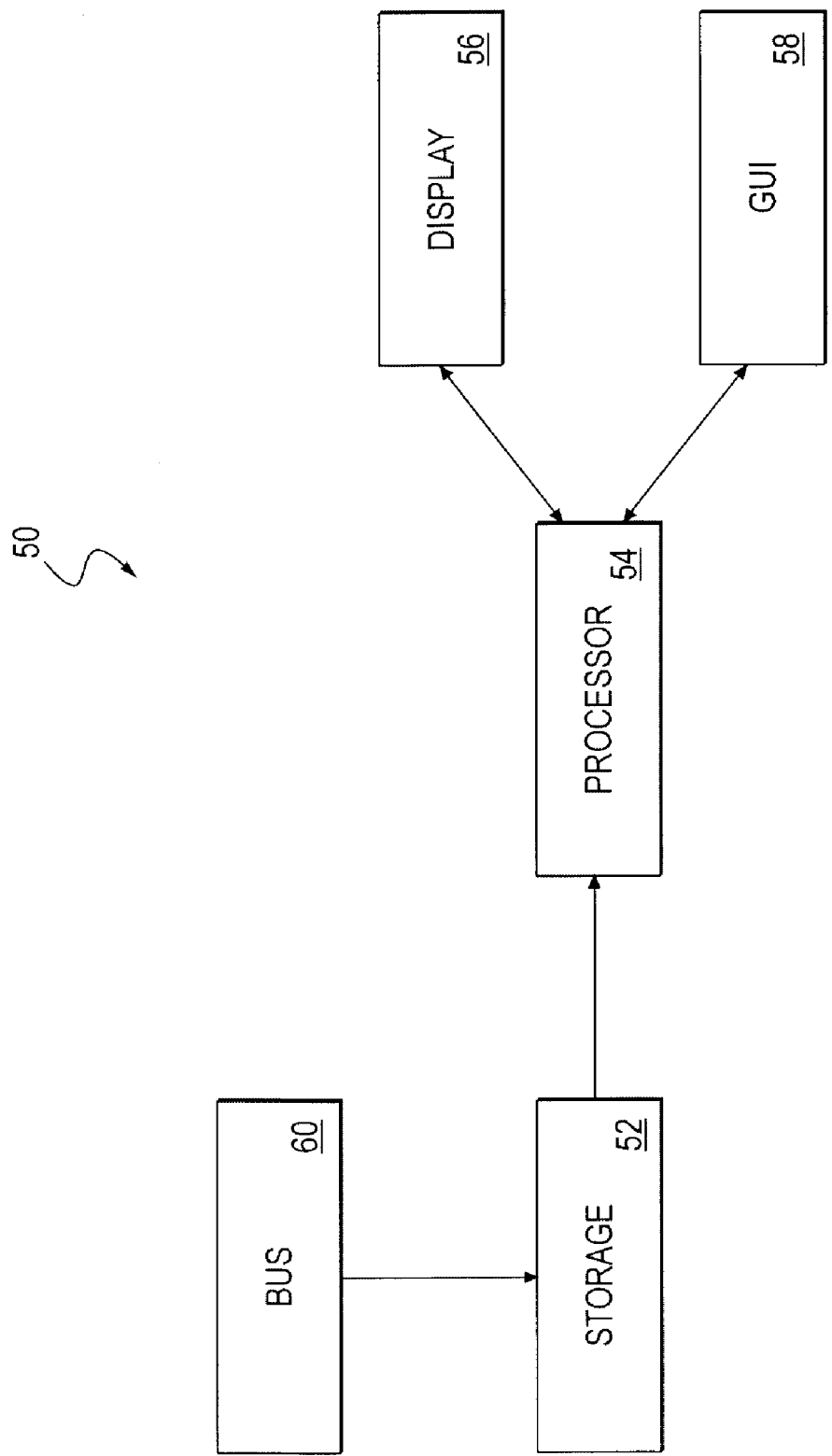
FIG. 5 illustrates a system for performing stochastic inversion methods in accordance with one or more embodiments of the invention.

In some embodiments, method 10 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 10 in response to instructions stored electronically on an electronic storage medium. The one or more processing devices may include one or more devices configured through hardware, firmware, and/or software to be specifically designed for execution of one or more of the operations of method 10. A system configured to execute a computer readable medium containing a program which, when executed, performs operations of the method 10 is schematically illustrated in FIG. 5. A system 50 includes a data storage device or memory 52. The stored data may be made available to a processor 54, such as a programmable general purpose computer. The processor 54 may include interface components such as a display 56 and a graphical user interface 58. The graphical user interface (GUI) may be used both to display data and processed data products and to allow the user to select among options for implementing aspects of the method. Data may be transferred to the system 50 via a bus 60 either directly from a data acquisition device, or from an intermediate storage or processing facility (not shown).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer implemented stochastic inversion method for estimating model parameters of an earth model of a subsurface geological volume of interest, the method comprising:
   a) acquiring at least one geophysical data set that samples a portion of the subsurface geological volume of interest, each geophysical data set defines an acquisition geometry of the subsurface geological volume of interest;
   b) generating a specified number of boundary-based multi-dimensional models of the subsurface geological volume of interest, said models being defined by model parameters;
   c) generating forward model responses of the models for each specified acquisition geometry;
   d) generating a likelihood value of the forward model responses matching the geophysical data set for each specified acquisition geometry;
   e) saving the model parameters as one element of a Markov Chain for each model;
   f) testing for convergence of the Markov Chains;
   g) updating the values of the model parameters for each model and repeating b) to f) in series or in parallel, until convergencey is reached;
   h) deriving probability density functions for each model parameter of the models which form the converged Markov Chains;
   i) calculating the variances, means, modes, and medians from the probability density functions of each model parameter for each model to generate estimates of model parameter variances and model parameters for the earth models of the subsurface geological volume of interest which are utilized to determine characteristics of the subsurface geological volume of interest.

2. The method of claim 1, wherein the multi-dimensional models are 2D, 3D or 4D.

3. The method of claim 1, wherein the model parameters are defined at nodes, and have values comprising an X,Y and Z value for defining the node location in space and at least one geophysical property value.

4. The method of claim 3, wherein model boundaries are defined by a unique collection of nodes.

5. The method of claim 3, wherein the at least one geophysical property value includes electrical conductivity or resistivity, compressional velocity, shear velocity, density, fluid saturations, pressure, temperature and/or porosity.

6. The method of claim 3, wherein the nodes define boundaries via interpolation of the geophysical property values in space between nodes to generate the model parameters required for the calculation of the forward model responses.

7. The method of claim 1, wherein the models are projected onto a finite-difference or finite-element mesh for calculation of the forward model responses.

8. The method of claim 1, wherein the geophysical data set includes controlled source electromagnetic data, magnetotelluric data, gravity data, magnetic data, seismic data, well production data or any combination of the foregoing.

9. The method of claim 1, wherein forward model responses for more than one type of geophysical data set are calculated to generate likelihood values for the combined geophysical data sets thus producing a joint inversion.

10. The method of claim 1, wherein Markov Chain Monte Carlo (MCMC) sampling is used to generate a sequence of model parameters that form a Markov Chain.

11. The method of claim 10, wherein the MCMC sampling algorithms included Metropolis-Hastings sampling and Slice Sampling algorithms.

12. The method of claim 1, wherein a sampling algorithm is utilized at each iteration of the updating the values of the model parameters for each model operation, and the sampling algorithm is determined by a random draw of a uniform variable wherein the probability of each sampling technique being used on any iteration is assigned at the start of the inversion.

13. The method of claim 1, wherein calculating the likelihood value of the forward model responses matching each of the geophysical data sets for the specified acquisition geometry is performed in accordance with a likelihood function.

14. The method of claim 1, wherein determining convergence of the Markov Chains is performed in accordance with a potential scale reduction factor.

15. The method of claim 1, wherein determining convergence of the Markov Chains computes the within-sequence variance and the between-sequence variance.

16. The method of claim 1, wherein the models defined by the model parameter means, modes and/or medians are used to define a starting model for deterministic (e.g. least squares) inversion to generate a model with the lowest root-mean square data misfit.

17. The method of claim 1, wherein the models defined by the model parameter means, modes and/or medians, and/or the model parameter variances are graphically displayed.

18. A system comprising:
a processor configured to execute a computer readable medium containing a program which, when executed, performs an operation comprising:
  a) acquiring at least one geophysical data set that samples a portion of the subsurface geological volume of interest, each geophysical data set defines an acquisition geometry of the subsurface geological volume of interest;
  b) generating a specified number of boundary-based multi-dimensional models of the subsurface geological volume of interest, said models being defined by model parameters;
  c) generating forward model responses of the models for each specified acquisition geometry;
  d) generating a likelihood value of the forward model responses matching the geophysical data set for each specified acquisition geometry;
  e) saving the model parameters as one element of a Markov Chain for each model;
  f) testing for convergence of the Markov Chains;
  g) updating the values of the model parameters for each model and repeating b) to f) in series or in parallel, until convergence is reached;
  h) deriving probability density functions for each model parameter of the models which form the converged Markov Chains;
  i) calculating the variances, means, modes, and medians from the probability density functions of each model parameter for each model to generate estimates of model parameter variances and model parameters for the earth models of the subsurface geological volume of interest which are utilized to determine characteristics of the subsurface geological volume of interest.

19. The system of claim 18, further comprising a display device, wherein the models defined by the model parameter means, modes and/or medians, and/or the model parameter variances are graphically displayed on the display device.

* * * * *